US007762528B2

(12) United States Patent
Butruille

(10) Patent No.: US 7,762,528 B2

(45) Date of Patent: Jul. 27, 2010

(54) DRAIN VALVE FOR PALLET-TYPE CONTAINER

(75) Inventor: Thibaut Butruille, Berg (FR)

(73) Assignee: Sotralentz S.A.S., Drulingen (FR)

(*) Notice: Subject to any disclaimer, the term of this patent is extended or adjusted under 35 U.S.C. 154(b) by 567 days.

(21) Appl. No.: 11/799,745

(22) Filed: May 2, 2007

(65) Prior Publication Data

US 2007/0257224 A1 Nov. 8, 2007

(30) Foreign Application Priority Data

May 3, 2006 (DE) ...................... 10 2006 020 447

(51) Int. Cl.
*F16K 1/22* (2006.01)

(52) U.S. Cl. .......................... 251/305; 251/368; 174/51

(58) Field of Classification Search ................. 251/304, 251/305, 368; 206/386; 174/51
See application file for complete search history.

(56) References Cited

U.S. PATENT DOCUMENTS

| | | | | |
|---|---|---|---|---|
| 2,966,167 | A * | 12/1960 | Jensen | 251/35 |
| 3,971,540 | A * | 7/1976 | Johnson et al. | 251/143 |
| 4,836,421 | A * | 6/1989 | Miyoshi et al. | 206/598 |
| 5,058,747 | A | 10/1991 | Decroix | 206/599 |
| 5,253,776 | A | 10/1993 | Decroix | 220/495 |
| 5,253,777 | A * | 10/1993 | Schutz | 206/386 |
| 5,609,184 | A * | 3/1997 | Apel et al. | 251/368 |
| 5,678,688 | A * | 10/1997 | Schutz | 206/386 |
| 5,979,871 | A * | 11/1999 | Forbes et al. | 251/305 |
| 6,156,969 | A | 12/2000 | Schutz | 174/17 |
| 6,679,227 | B2 | 1/2004 | Sawert et al. | 123/509 |
| 6,923,429 | B2 * | 8/2005 | Merrill et al. | 251/305 |
| 2001/0017362 | A1 | 8/2001 | Schutz | 251/306 |
| 2004/0003841 | A1 * | 1/2004 | Rentschler et al. | 251/308 |
| 2004/0124387 | A1 * | 7/2004 | Schutz | 251/148 |
| 2005/0062008 | A1 * | 3/2005 | Makino et al. | 251/306 |

FOREIGN PATENT DOCUMENTS

| | | |
|---|---|---|
| DE | 10124681 | 11/2002 |
| EP | 1547967 | 6/2005 |

* cited by examiner

*Primary Examiner*—John Bastianelli
(74) *Attorney, Agent, or Firm*—Andrew Wilford

(57) ABSTRACT

A drain valve used on an at least partially dielectric container has a valve housing made of electrically nonconductive plastic, fixed to the container, and forming a passage opening into the container so that fluent contents of the container can flow out of the container through the passage. A valve body formed at least partially of an electrically conductive material is movable in the passage between a closed position blocking flow through the passage and an open position permitting flow through the passage. An actuating element outside the housing is connected to the body for shifting same between its positions.

10 Claims, 4 Drawing Sheets

DRAIN VALVE FOR PALLET-TYPE CONTAINER

FIELD OF THE INVENTION

The present invention relates to a stopcock-type drain valve. More particularly this invention concerns such a valve used on a pallet-type container.

BACKGROUND OF THE INVENTION

A typical pallet-type bulk container as described in U.S. Pat. Nos. 5,958,747 5,058,747 and 5,253,776 comprises a large flexible bladder, typically made of plastic and capable of holding a volume of about one cubic meter that sits on a pallet and is surrounded by a metallic cage. The bladder is normally filled with a liquid or a fluent powder so that the full container can easily weigh around 1 ton.

Such a valve typically comprises a housing defining a flow passage, a valve body movable in the passage between a closed position blocking flow through it and an open position permitting free flow, and an actuating element or handle for moving the valve body between its positions. The housing is normally made of plastic, e.g. polyethylene (PE), with an upstream or intake side formed as a nipple connected fixedly to the bladder of the container and a downstream or output side also formed as a nipple that can be threaded to allow connection of a hose. A tear-out disk can be integrally formed in the output side as a tamper indicator and to provide an extra protection against leakage. The valve body is typically of the quarter-turn type, constituted as a disk that extends perpendicular to the axis of the flow passage in the closed position and parallel to it in the open position. Such a valve is described in EP 1,547,967 of H. Bour.

When such a valve is used for the transport and storage of combustible, flammable, or explosive media, for example liquids or bulk materials, electrostatic charges must be avoided for safety reasons. This requires grounding the container's contents. Since the goods are completely surrounded by the normally dielectric bladder, the standard way of doing this is by means of the drain valve that is always at the lower region of the container and thus in continuous contact with its contents. For this reason it has been proposed for the valve housing of a drain valve of the above-described type to be made completely of an electrically conductive plastic. Such electrically conductive plastics are known in principle, and may be, for example, polyethylene to which electrically conductive particles are added. The problem that this causes is that such plastics are not strong and rigid enough. The valve housing can deform, making the valve impossible to operate, or causing a leak.

OBJECTS OF THE INVENTION

It is therefore an object of the present invention to provide an improved drain valve for pallet-type container.

Another object is the provision of such an improved drain valve for pallet-type container that overcomes the above-given disadvantages, in particular that is extremely strong and rigid, but that provides for excellent grounding of the contents of the dielectric container to which it is attached.

SUMMARY OF THE INVENTION

A drain valve used on a dielectric container has according to the invention a valve housing made of electrically nonconductive plastic, fixed to the container, and forming a passage opening into the container so that fluent contents of the container can flow out of the container through the passage. A valve body formed at least partially of an electrically conductive material is movable in the passage between a closed position blocking flow through the passage and an open position permitting flow through the passage. An actuating element outside the housing is connected to the body for shifting same between its positions.

Thus in accordance with the invention the valve housing is made of an electrically nonconductive plastic, while the movable valve body is made of an electrically conductive material such as electrically conductive plastic.

According to the preferred embodiment of the drain valve as a "butterfly valve," the valve body is made of electrically conductive plastic, that is rotatably or pivotally mounted in the flow. The conductive plastic is, for example, a thermoplastic plastic such as PE which is mixed with conductive particles, for example carbon particles.

The invention is based on the discovery that, first and foremost, it is practical to produce the valve housing of a drain valve from a nonconductive plastic, for example conventional nonconductive polyethylene (PE), in a manner known as such, since such a valve housing made of nonconductive polyethylene; in contrast to a valve housing made of electrically conductive polyethylene, meets all requirements regarding stability. According to the invention, it is still possible to achieve proper grounding of the container contents and thus satisfactorily avoid electrostatic charges. The invention recognizes that to avoid electrostatic charges it is sufficient for only the valve body in the flow passage to be made of electrically conductive plastic, whereby, of course, it must be ensured that this valve body is then appropriately grounded. In any case, it is not necessary for the entire valve housing to be made of electrically conductive plastic.

It is preferable for an actuating stem, rotatably supported in the valve housing, to be connected in a rotationally fixed manner to the valve body in a manner known as such, whereby an actuating element, for example a handle, operates on this actuating stem and thus actuates the valve body. In one such embodiment the invention provides that the actuating stem is composed at least partially of an electrically conductive material, for example electrically conductive plastic. The invention is thus based on the finding that the valve body, which is in contact with the container contents, may be satisfactorily grounded by means of the actuating stem connected to the valve body when the actuating stem is also composed of an electrically conductive plastic. This design has no effect on the stability of the valve housing, since the valve housing itself is made of nonconductive plastic. The actuating stem may have a core made of metal, for example, which is encased or extrusion coated at least in places, with electrically conductive plastic. The actuating stem is a plastic molded part, for example an injection-molded part made of thermoplastic electrically conductive plastic, having an injected metal pin.

Proper grounding by means of the valve body and the actuating stem connected thereto is achieved in particular when a connector is connected to the actuating stem, and in turn a grounding cable is connectable to the connector, for example by means of a plug. By use of such a connector the electrically conductive path extends, in a manner of speaking, from the valve housing and optionally from the actuating element such as a handle, so that a grounding cable may then be easily connected, for example by use of a plug. If the actuating element, for example the handle, has a bearing sleeve in a manner known as such which overlaps a bearing collar of the bearing housing, the invention provides that the bearing sleeve has a recess through which the connector passes, at least in places.

The actuating stem is supported at one end in a first bearing for example a bearing collar, in the bearing housing, and at a second end in a second bearing for example a bearing bush, in the bearing housing. The valve body is preferably attached in a rotationally fixed manner to a valve section situated between the ends of the stem. The actuating stem also has an actuating section extending past, the first bearing, to which the actuating element, for example the handle, is connected. The connector, which connects to the actuating stem and therefore also the valve body in an electrically conductive manner to a grounding cable, for example, may preferably be connected to the actuating end of the actuating stem. The invention is based on the discovery that such a connector in this region is very accessible and thus allows a particularly simple attachment of a grounding cable. This applies in particular when a bearing sleeve, previously described, for the handle has a corresponding recess, for example a slot, through which a portion of the connector is guided.

The connector may be designed as a perforated metal disk or the like, or have a perforated disk, whereby such a perforated disk may be easily mounted on the actuating stem, for example on the actuating section thereof. At least one connecting tab or connecting rod is connected to this perforated disk (for example, on the outer circumferential side), this connecting tab or connecting rod passing through the described recess in the bearing sleeve so that the connecting tab or connecting rod is accessible from the outside, thus allowing a connecting plug of a grounding cable to be mounted.

According to a further proposal of the invention, the individual axially spaced sections of the bearing rod have different cross-sectional shapes and different cross sections, at least in places. Thus, the first end and the second end are preferably provided with a circular cross section, while the valve section situated therebetween preferably has at least one flat or an polygonal cross section, for example a square or rectangular cross section, thus permitting a rotationally fixed connection of the actuating stem to the valve body. The actuating stem adjoining the first bearing on the top side in turn preferably has at least one flat or a polygonal cross section, for example a square or rectangular cross section. This allows a rotationally fixed connection of the handle to the actuating stem, as well as a rotationally fixed connection of the actuating stem to the connector. It is advantageous for the "angular" actuating section to have a smaller diameter compared to the first bearing, thus forming a circumferential shoulder. According to the invention the connector, for example the perforated disk, rests on this shoulder so that the perforated disk is situated, in a manner of speaking in the transition region between the bearing and the actuating section. The perforated disk on its inner edge may have a contact formation that bites into the actuating stem, this contact surface preferably being formed by an enlargement, a flare, or the like on the circumferential inner side of the perforated disk, thus providing a good electrical contact. The invention further provides that the perforated disk has an outer circumferential collar overlapping the shoulder, so that the perforated disk easily rests with an additional contact surface on the shoulder of the actuating stem, thereby providing a satisfactory contact.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
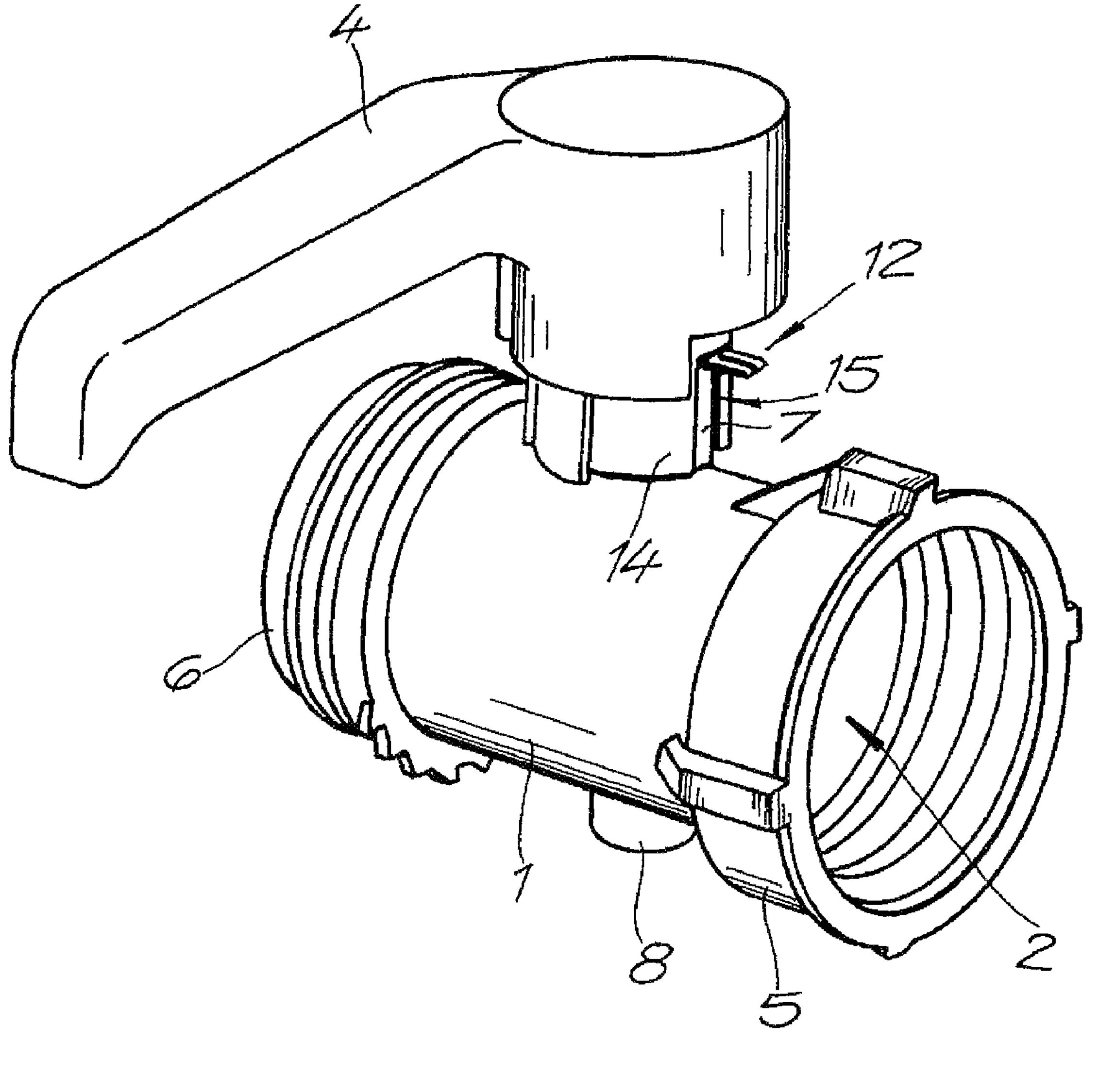
FIG. 1 is a perspective valve of the drain valve according to the invention.
Figure 2:
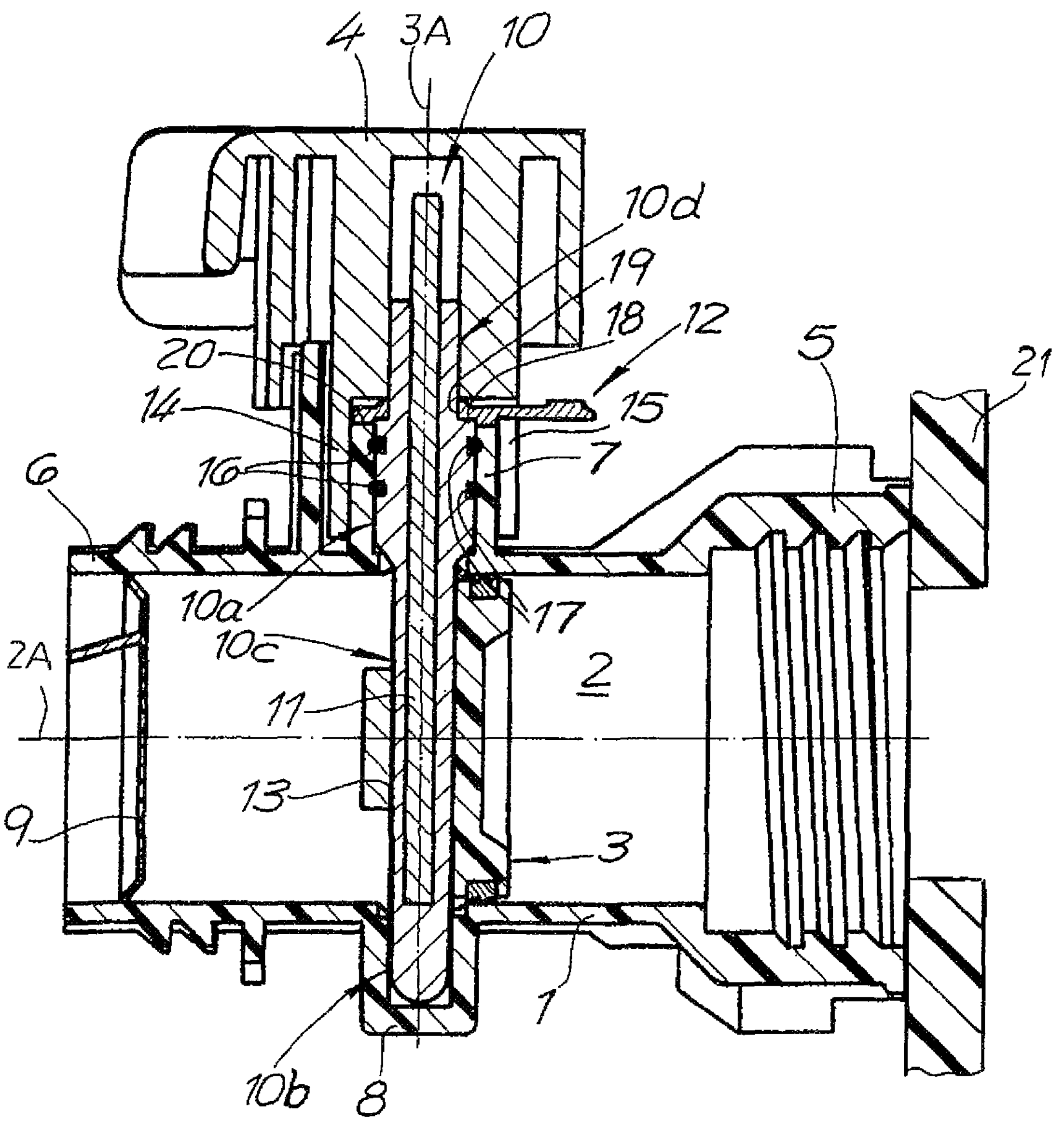
FIG. 2 is an axial and vertical section through the valve.

As seen in FIGS. 1 and 2 a drain valve for a dielectric pallet container shown partially in FIG. 2 at 21 has a valve housing 1 defining a flow passage 2 centered on an axis 2A, a valve body 3 in the flow passage 2, and an actuating element 4 for the valve body 3. In the illustrated embodiment the drain valve is designed as a butterfly valve, so that the valve body 3 is pivotal or rotatable in the flow passage 2 about an axis 3A perpendicular to the axis 2. In the illustrated embodiment the actuating element 4 is a radially extending handle for the valve body 3. The valve housing 1 has an inlet socket 5 for connection to a discharge connector of the pallet container 21 made of dielectric material, here a plastic bladder. The valve housing 1 also has an outlet connector 6 to which, for example, a cover cap or hose (not illustrated) may be screwed. A bearing collar 7 and a bearing bush 8 oppositely situated from the bearing collar 7 are provided between the connectors 5 and 6, orthogonal to the flow passage 2 and aligned on the axis 3A. The valve housing 1 comprising the connecting piece 5, drain connector 6, bearing collar 7, and bearing bush 8, together with a removable sealing disk 9 for the flow passage 2 integrated in the drain connector 6, is designed as a one-piece molded part, for example an injection-molded part, made of thermoplastic plastic, preferably polyethylene, for example high-density polyethylene.

According to the invention, the valve housing 1 is made of an electrically nonconductive plastic, while the movable valve body 3 is made of an electrically conductive plastic. In this manner electrostatic charges in the container contents, for example a combustible liquid, may be reliably avoided, since grounding is possible by means of the electrically conductive valve body 3. Since the valve housing 1 made of an electrically nonconductive plastic, it has is particularly strong and rigid, according to the invention this grounding being achieved while at the same time providing greater strength for the drain valve.

Figure 3:
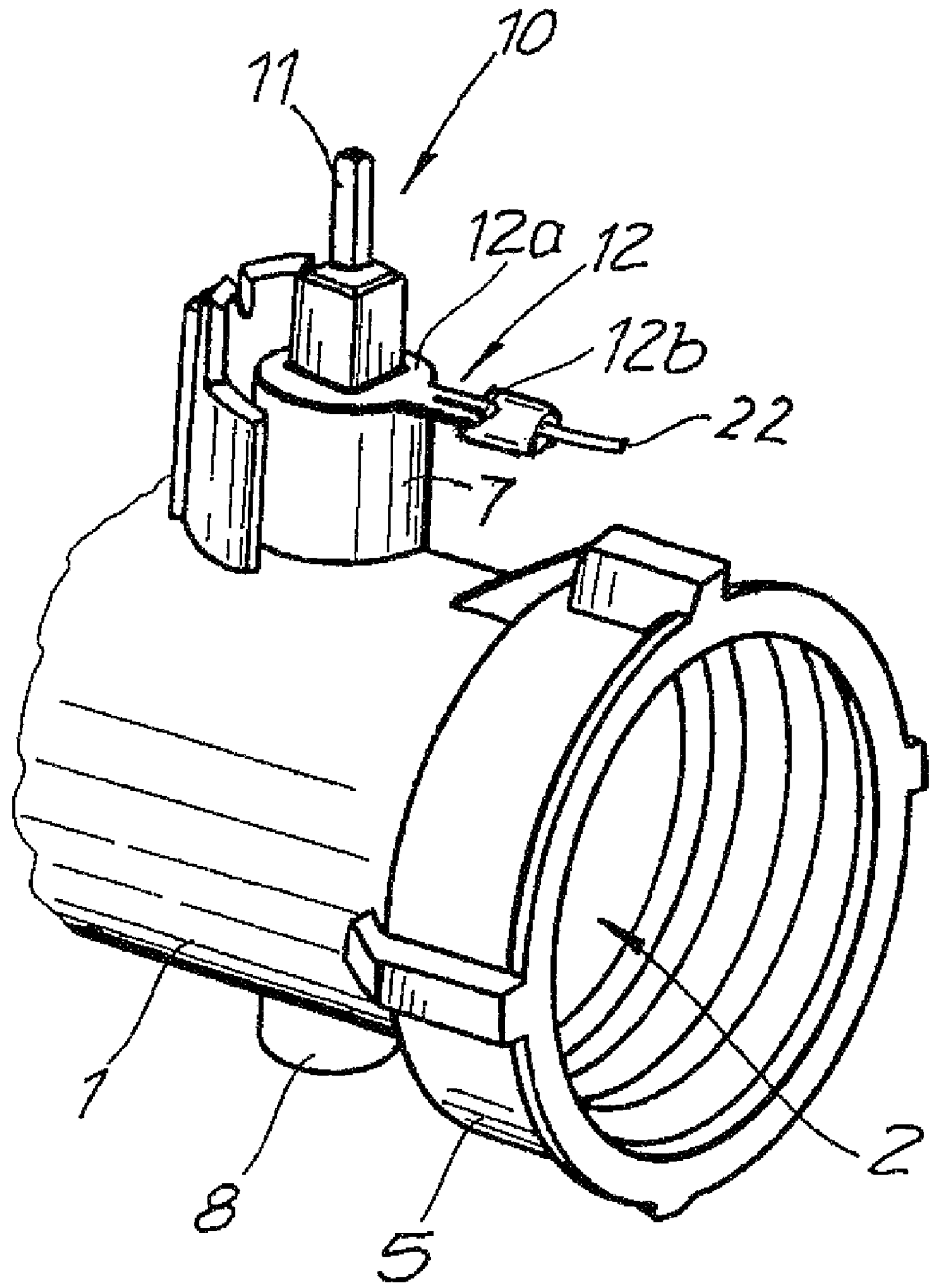
FIG. 3 is a perspective view of a detail of the valve with the actuating handle removed.
Figure 4:
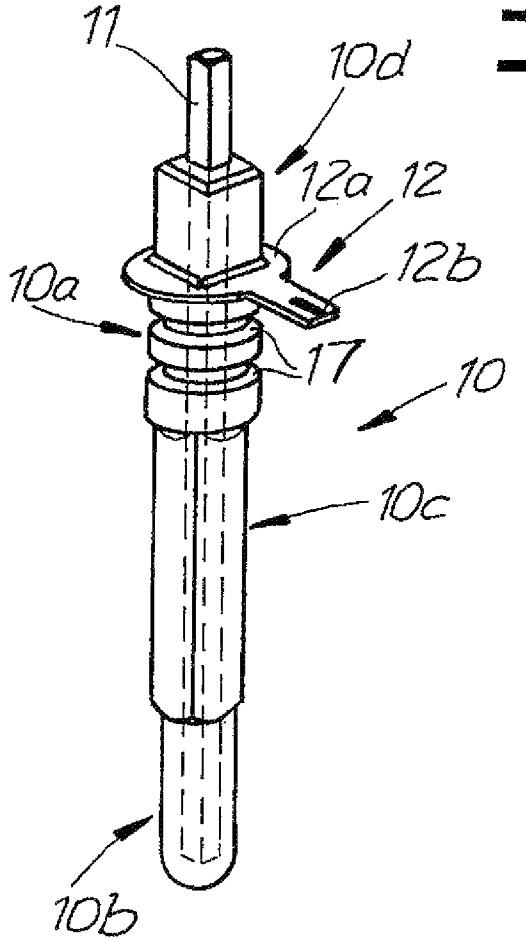
FIG. 4 is a perspective view of the valve-body stem.
Figure 5:
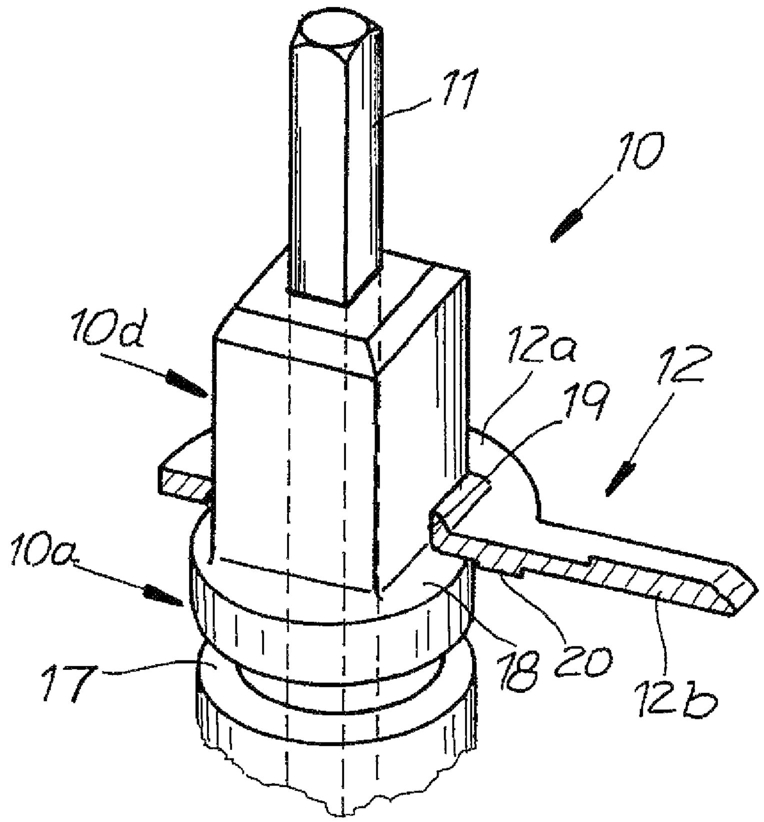
FIG. 5 is a large-scale and partly sectional view of a detail of FIG. 4.

FIGS. 3-5 also show that the valve body 3 for opening and closing the drain valve is actuated via the handle 4 by means of an actuating stem 10 connected to the valve body 3, the actuating stem 10 being rotatably supported in the valve housing 1. According to the invention, this actuating stem 10 is made of an electrically conductive plastic, at least partially. In the illustrated embodiment the actuating stem 10 has a core 11 made of metal, for example a metal rod 11, which is encased in electrically conductive plastic, for example electrically conductive PE, during manufacture of the actuating stem.

This is shown in particular in a comparative view of FIGS. 2 and 4.

FIG. 4 in particular shows that a connector 12 is connected to the actuating stem 10, and in turn a grounding cable 22 may be connected to this connector 12 by means of a press on plug, for example. The grounding cable 22 in turn is connected in an electrically conductive manner to an electrically conductive component of the pallet container, for example to the cage of a metal pallet, so that the container contents are satisfactory grounded by means of the valve body 3, actuating stem 10, connector 12, and grounding cable, and in this manner an electrostatic charge cannot build up.

The design and mode of functioning of the actuating stem 10 are shown in a comparative consideration of FIGS. 2 and 4. According to the drawing, the actuating stem 10 is rotatably supported at a first bearing 10*a* in a bearing, namely, in the bearing collar 7 in the bearing housing 1, and at a second bearing 10*b* in a second bearing, namely, the bearing bush 8 in the bearing housing 1. Between this first bearing 10*a* and the second bearing 10*b* the actuating stem 10 has a valve section 10*c* that is connected in a rotationally fixed manner to the valve body 3. For this purpose the valve section 10*c* of the actuating stem 10 engages in a very tight form-fit in a hole 13 in the valve body 3. An actuating section 10*d* is adjacent the first bearing 10*a* on the top stem end, and the handle 4 is mounted via a square hole to the actuating section 10*d* in a rotationally fixed manner. As shown in particular in FIG. 4, the connector 12 for the grounding cable is connected to the actuating stem 10 in the region of the actuating section 19*d*. The connector 12 has a perforated disk 12*a* which is mounted on the actuating stem 10. Connected to this perforated disk 12*a* on the outer circumferential side is a connecting tab 12*b* or connecting rod on which a corresponding plug of the grounding cable may be mounted. This is possible because a bearing sleeve 14 of the handle 4 overlaps the bearing collar 7 and has a slot 15 through which the connecting tab 12*b* passes, so that the connecting tab 12*b* is guided out of the bearing sleeve 14 through this slot 15 and is easily accessible.

The connector 12 comprising the perforated disk 12*a* and the adjoining connecting tab 12*b* may likewise be designed as a one-piece plastic part made of electrically conductive plastic. However, the connector 12 may also be a one-piece metal molded part. In either case, an electrically conductive connection is formed between the connector 12 and the actuating stem 10, which in turn is connected to the valve body 3 in an electrically conductive manner.

FIG. 4 shows that the first bearing 10*a* and the second bearing 10*b* each have a circular cross section and are respectively complementarily fitted to the respective bearings 7 and 8, namely, the bearing collar 7 and the bearing bush 8. According to FIG. 2, the bearing bush 8 is closed at its lower end. The first bearing 10*a* has seal rings 16 that are also provided in the corresponding grooves 17 of the stem 10. The valve section 10*c* has an angular, namely, a rectangular or square, design, so that a rotationally fixed connection to the valve body 3 may be easily achieved. The actuating section 10*d* also has an angular, namely, a rectangular or square, cross section, so that the handle 4 may be easily mounted on the actuating section 10*d* in a rotationally fixed manner. Accordingly, the perforated disk 12*a* is also provided with a corresponding square or rectangular inner recess which is adapted to the cross section of the actuating section 10*d*. FIG. 4 also shows that the actuating section 10*d* has a smaller diameter compared to the first bearing 10*a*, thus forming a circumferential shoulder 18. According to FIG. 5 the connector 12 rests on this shoulder 18. The perforated disk 12*a* on its inner circumferential side has a contact tab 19 which contacts the actuating stem 10*d*, in the illustrated embodiment the contact surface being formed by an enlargement or bead on the inner circumferential side. The perforated disk 12*a* also has an outer collar 20 overlapping the shoulder 18 (see FIG. 5), resulting in an additional contact surface in the region of the shoulder 18.

I claim:

1. A drain valve for a container, the valve comprising:

a valve housing made of electrically nonconductive plastic, fixed to the container, and forming a passage opening into the container, whereby fluent contents of the container provided with the valve can flow out of the container through the passage;

an electrically conductive valve stem extending along a stem axis through the housing;

a valve body carried on the stem, formed of an electrically conductive plastic, and pivotal in the passage between a closed position blocking flow through the passage and an open position permitting flow through the passage;

an actuating element outside the housing, formed with a radially throughgoing slot, and connected to the body for shifting the body between its positions; and an electrical connector outside the housing, fixed to the stem, extending through the slot, and adapted to be connected to a grounding cable.

2. The valve defined in claim 1 wherein the stem has a conductive center rod.

3. The valve defined in claim 2 wherein the rod is of metal.

4. A drain valve for a container, the valve comprising:

a valve housing made of electrically nonconductive plastic, fixed to the container, and forming a passage opening into the container, whereby fluent contents of the container provided with the valve can flow out of the container through the passage;

an electrically conductive valve stem extending along a stem axis through the housing;

a pair of bearings formed in the housing, aligned on the stem axis, and diametrally flanking the passage, the stem having ends pivotal in the respective bearings and a center portion between the ends pivotally fixed to the valve body, one of the ends projecting through the respective bearing from the housing a valve body carried on the stem, formed electrically conductive material, and pivotal in the passage between a closed position blocking flow through the passage and an open position permitting flow through the passage;

an actuating element outside the housing and connected to one end of the body for shifting the body between its positions; and an electrical connector connected to the one end of the stem, the actuator element having a socket fitted complementarily over the one stem end and formed with relative to the stem axis a radially throughgoing slot through which the connector extends.

5. The valve defined in claim 1 wherein the housing is formed with a pair of bearings aligned on the stem axis and diametrally flanking the passage, the stem having ends pivotal in the respective bearings and a center portion between the ends pivotally fixed to the valve body, one of the ends projecting through the respective bearing from the housing and connected to the actuating element.

6. The valve defined in claim 4 wherein the connector is outside the housing, fixed to the stem, and adapted to be connected to a grounding cable.

7. The valve defined in claim 5 wherein the connector is a metal plate formed with a polygonal hole complementarily fitted over the one end.

8. The valve defined in claim 7 wherein the stem is formed with a radially projecting shoulder on which the connector sits.

9. The valve defined in claim 7 wherein the connector is formed with a radially inwardly projecting tab biting into the one end of the stem.

10. The valve defined in claim 7 wherein the connector has an axially extending collar tightly surrounding the one end of the stem.

* * * * *